(12) United States Patent
Hawkins et al.

(10) Patent No.: US 8,976,108 B2
(45) Date of Patent: Mar. 10, 2015

(54) INTERFACE FOR PROCESSING OF AN ALTERNATE SYMBOL IN A COMPUTER DEVICE

(75) Inventors: Jeffrey C. Hawkins, Atherton, CA (US); William B. Rees, Menlo Park, CA (US); Debbie O. Chyi, Burlingame, CA (US); Robert Y. Haitani, Menlo Park, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1791 days.

(21) Appl. No.: 11/112,178

(22) Filed: Apr. 22, 2005

(65) Prior Publication Data

US 2005/0179654 A1    Aug. 18, 2005

Related U.S. Application Data

(63) Continuation of application No. 09/977,870, filed on Oct. 14, 2001, now Pat. No. 6,975,304.

(60) Provisional application No. 60/297,817, filed on Jun. 11, 2001.

(51) Int. Cl.
| | | |
|---|---|---|
| *G09G 5/00* | (2006.01) | |
| *G09G 5/10* | (2006.01) | |
| *G06F 3/023* | (2006.01) | |
| *G06F 3/0489* | (2013.01) | |

(52) U.S. Cl.
CPC ........... *G06F 3/0236* (2013.01); *G06F 3/0489* (2013.01)
USPC ........................................... 345/156; 345/691

(58) Field of Classification Search
USPC ...................... 345/168–173, 863; 341/22–26; 455/556.1, 566; 704/1–8; 715/531–536
See application file for complete search history.

(56) References Cited

U.S. PATENT DOCUMENTS

| | | |
|---|---|---|
| 3,573,376 A | 4/1971 | Bartlett et al. |
| 4,279,021 A | 7/1981 | See et al. |

(Continued)

FOREIGN PATENT DOCUMENTS

| | | |
|---|---|---|
| CA | 2187050 | 5/1997 |
| EP | 0149762 A1 | 7/1986 |

(Continued)

OTHER PUBLICATIONS

Basterfield, D., "The IBM PalmTop PC110," Jan. 30, 2000, pp. 1-3.
Blackberry Handheld Installation & Getting Started Guide, © 2002 Copyright by Research in Motion Limited, 295 Philip Street, Waterloo, Ontario, Canada N2L 3W8. Revised Feb. 27, 2003, pp. 39-41. (www.rim.net).
Microsoft, "The Windows Interface an Application Design Guide," 1987, pp. 84-87, Figures 1-6.

(Continued)

*Primary Examiner* — Michael Faragalla
(74) *Attorney, Agent, or Firm* — Mahamedi Paradice LLP

(57) ABSTRACT

Described herein is a computer-implemented system and method for processing one or more alternate symbols associated or linked to a base symbol. A base symbol is a symbol to which at least one alternate symbol is linked. A base symbol commonly appears on a key of a keyboard or a display of a keyboard, or is a handwritten symbol recognized by handwriting entry software. Examples of alternate symbols are accented characters and punctuation marks that do not appear on a keyboard or are not commonly recognized by a handwriting entry program, and short symbol sequences. An example of a common short symbol sequence is an emoticon used in e-mail messages to convey tone or feelings. An example of a computer device that may embody the system or method is a hand-held computing device.

25 Claims, 8 Drawing Sheets

(56) References Cited

U.S. PATENT DOCUMENTS

| | | | |
|---|---|---|---|
| 4,415,065 A | 11/1983 | Sandstedt | |
| 4,545,023 A | 10/1985 | Mizzi | |
| 4,587,630 A | 5/1986 | Straton et al. | |
| 4,725,694 A | 2/1988 | Auer et al. | |
| 4,797,912 A | 1/1989 | Hashimoto | |
| 4,799,254 A | 1/1989 | Dayton et al. | |
| 4,916,441 A | 4/1990 | Gombrich | |
| 4,922,526 A | 5/1990 | Morganstein et al. | |
| 4,931,783 A | 6/1990 | Atkinson | |
| 4,972,457 A | 11/1990 | O'Sullivan | |
| 4,996,704 A | 2/1991 | Brunson | |
| 5,010,547 A | 4/1991 | Johnson et al. | |
| 5,067,164 A | 11/1991 | Denker et al. | |
| 5,075,684 A | 12/1991 | DeLuca | |
| 5,101,439 A | 3/1992 | Kiang | |
| 5,127,041 A | 6/1992 | O'Sullivan | |
| RE34,034 E | 8/1992 | O'Sullivan | |
| 5,148,471 A | 9/1992 | Metroka et al. | |
| 5,175,759 A | 12/1992 | Metroka et al. | |
| 5,189,632 A | 2/1993 | Paajanen et al. | |
| 5,227,614 A | 7/1993 | Danielson et al. | |
| 5,249,218 A | 9/1993 | Sainton | |
| 5,334,824 A | 8/1994 | Martinez | |
| 5,335,276 A | 8/1994 | Thompson et al. | |
| 5,353,334 A | 10/1994 | O'Sullivan | |
| 5,367,563 A | 11/1994 | Sainton | |
| D354,478 S | 1/1995 | Miyahara | |
| 5,379,057 A | 1/1995 | Clough et al. | |
| 5,384,844 A | 1/1995 | Rydbeck | |
| 5,392,447 A | 2/1995 | Schlack et al. | |
| 5,394,140 A | 2/1995 | Wong et al. | |
| 5,396,544 A | 3/1995 | Gilbert et al. | |
| 5,410,593 A | 4/1995 | Kamota | |
| D359,734 S | 6/1995 | Nagele et al. | |
| 5,430,436 A | 7/1995 | Fennell | |
| 5,436,960 A | 7/1995 | Campana, Jr. et al. | |
| 5,438,611 A | 8/1995 | Campana, Jr. et al. | |
| 5,446,759 A | 8/1995 | Campana, Jr. et al. | |
| 5,465,401 A | 11/1995 | Thompson | |
| 5,479,472 A | 12/1995 | Campana, Jr. et al. | |
| 5,485,373 A | 1/1996 | Davis et al. | |
| 5,496,992 A | 3/1996 | Madan et al. | |
| 5,500,643 A | 3/1996 | Grant | |
| 5,550,715 A | 8/1996 | Hawkins | |
| 5,584,054 A | 12/1996 | Tyneski et al. | |
| 5,585,749 A | 12/1996 | Pace et al. | |
| 5,594,640 A | 1/1997 | Capps et al. | |
| 5,612,682 A | 3/1997 | DeLuca et al. | |
| 5,625,670 A | 4/1997 | Campana, Jr. et al. | |
| 5,631,946 A | 5/1997 | Campana, Jr. et al. | |
| 5,633,912 A | 5/1997 | Tsoi | |
| 5,640,146 A | 6/1997 | Campana, Jr. et al. | |
| 5,640,444 A | 6/1997 | O'Sullivan | |
| 5,650,769 A | 7/1997 | Campana, Jr. et al. | |
| 5,650,776 A | 7/1997 | Mitchell et al. | |
| 5,673,040 A | 9/1997 | Hargreaves et al. | |
| D385,875 S | 11/1997 | Harris et al. | |
| D386,497 S | 11/1997 | Huslig et al. | |
| 5,694,428 A | 12/1997 | Campana, Jr. et al. | |
| 5,710,798 A | 1/1998 | Campana, Jr. et al. | |
| 5,714,937 A | 2/1998 | Campana, Jr. et al. | |
| 5,717,725 A | 2/1998 | Campana, Jr. et al. | |
| 5,722,059 A | 2/1998 | Campana, Jr. et al. | |
| 5,722,064 A | 2/1998 | Campana, Jr. et al. | |
| 5,724,408 A | 3/1998 | Morganstein | |
| D393,856 S | 4/1998 | Lee et al. | |
| 5,742,644 A | 4/1998 | Campana, Jr. et al. | |
| 5,745,532 A | 4/1998 | Campana, Jr. et al. | |
| 5,748,100 A | 5/1998 | Gutman et al. | |
| 5,751,707 A | 5/1998 | Voit et al. | |
| 5,751,773 A | 5/1998 | Campana, Jr. et al. | |
| D395,300 S | 6/1998 | Yamazaki et al. | |
| 5,761,621 A | 6/1998 | Sainton | |
| 5,790,659 A | 8/1998 | Strand | |
| 5,793,365 A | 8/1998 | Tang et al. | |
| 5,797,089 A | 8/1998 | Nguyen | |
| 5,797,098 A | 8/1998 | Schroeder et al. | |
| 5,798,759 A | 8/1998 | Dahl | |
| 5,805,633 A | 9/1998 | Uddenfeldt | |
| 5,805,978 A | 9/1998 | Souissi et al. | |
| 5,812,117 A | 9/1998 | Moon | |
| 5,818,437 A | 10/1998 | Grover et al. | |
| 5,819,172 A | 10/1998 | Campana, Jr. et al. | |
| 5,825,353 A | 10/1998 | Will | |
| 5,825,675 A | 10/1998 | Want et al. | |
| 5,844,967 A | 12/1998 | Lee | |
| 5,854,985 A | 12/1998 | Sainton et al. | |
| 5,864,805 A | 1/1999 | Chen et al. | |
| 5,870,492 A * | 2/1999 | Shimizu et al. | 382/187 |
| 5,884,193 A | 3/1999 | Kaplan | |
| 5,884,323 A | 3/1999 | Hawkins et al. | |
| D408,021 S | 4/1999 | Haitani et al. | |
| D408,030 S | 4/1999 | Richards et al. | |
| 5,894,505 A | 4/1999 | Koyama | |
| D409,185 S | 5/1999 | Kawashima | |
| D410,486 S | 6/1999 | Takahata et al. | |
| 5,918,188 A | 6/1999 | Doran | |
| 5,926,170 A | 7/1999 | Oba | |
| 5,938,772 A | 8/1999 | Welch | |
| 5,943,401 A | 8/1999 | Risner et al. | |
| 5,949,408 A | 9/1999 | Kang et al. | |
| 5,952,942 A | 9/1999 | Balakrishnan et al. | |
| 5,957,595 A | 9/1999 | Chen | |
| 5,958,006 A | 9/1999 | Eggleston et al. | |
| 5,966,671 A | 10/1999 | Mitchell et al. | |
| 5,974,238 A | 10/1999 | Chase, Jr. | |
| D416,001 S | 11/1999 | Tal et al. | |
| D416,256 S | 11/1999 | Griffin et al. | |
| 5,983,073 A | 11/1999 | Ditzik | |
| 5,990,872 A | 11/1999 | Jorgenson et al. | |
| 5,991,290 A | 11/1999 | Malik | |
| 5,996,956 A | 12/1999 | Shawver | |
| 6,000,000 A | 12/1999 | Hawkins et al. | |
| 6,005,496 A | 12/1999 | Hargreaves et al. | |
| 6,006,274 A | 12/1999 | Hawkins et al. | |
| 6,011,554 A | 1/2000 | King et al. | |
| 6,022,156 A | 2/2000 | Blish | |
| 6,028,923 A | 2/2000 | Kolb et al. | |
| D421,744 S | 3/2000 | Ono | |
| 6,040,829 A | 3/2000 | Croy et al. | |
| 6,043,760 A | 3/2000 | Laakkonen et al. | |
| D423,468 S | 4/2000 | Jenkins | |
| 6,047,196 A | 4/2000 | Maekelae et al. | |
| 6,049,796 A | 4/2000 | Siitonen et al. | |
| 6,052,735 A | 4/2000 | Ulrich et al. | |
| 6,055,305 A | 4/2000 | Norman et al. | |
| 6,058,304 A | 5/2000 | Callaghan et al. | |
| 6,067,451 A | 5/2000 | Campana, Jr. et al. | |
| 6,075,925 A | 6/2000 | Downing et al. | |
| 6,081,845 A | 6/2000 | Kanemaki et al. | |
| D432,099 S | 10/2000 | Loh et al. | |
| D432,535 S | 10/2000 | Loh et al. | |
| D433,016 S | 10/2000 | Matsuda et al. | |
| 6,134,453 A | 10/2000 | Sainton et al. | |
| 6,141,540 A | 10/2000 | Richards et al. | |
| 6,154,758 A * | 11/2000 | Chiang | 715/263 |
| 6,157,630 A | 12/2000 | Adler et al. | |
| 6,160,926 A | 12/2000 | Dow et al. | |
| 6,169,485 B1 | 1/2001 | Campana, Jr. et al. | |
| 6,188,789 B1 | 2/2001 | Marianetti, II et al. | |
| D439,232 S | 3/2001 | Ledingham et al. | |
| 6,198,783 B1 | 3/2001 | Campana, Jr. et al. | |
| 6,204,848 B1 | 3/2001 | Nowlan et al. | |
| RE37,141 E | 4/2001 | O'Sullivan | |
| D440,959 S | 4/2001 | Wolf et al. | |
| 6,219,413 B1 | 4/2001 | Burg | |
| 6,219,694 B1 | 4/2001 | Lazaridis et al. | |
| D442,156 S | 5/2001 | Lee | |
| 6,229,878 B1 | 5/2001 | Moganti | |
| D443,865 S | 6/2001 | Kim | |
| D446,199 S | 8/2001 | Xu et al. | |
| 6,272,190 B1 | 8/2001 | Campana, Jr. et al. | |
| 6,278,442 B1 | 8/2001 | Griffin et al. | |
| 6,288,718 B1 | 9/2001 | Laursen et al. | |

(56) References Cited

U.S. PATENT DOCUMENTS

| | | |
|---|---|---|
| 6,295,052 B1 | 9/2001 | Kato et al. |
| 6,295,372 B1 | 9/2001 | Hawkins et al. |
| 6,295,460 B1 | 9/2001 | Nagel et al. |
| 6,297,795 B1 | 10/2001 | Kato et al. |
| 6,307,548 B1 | 10/2001 | Flinchem et al. |
| 6,310,926 B1 | 10/2001 | Tore |
| D450,307 S | 11/2001 | Xu et al. |
| 6,317,592 B1 | 11/2001 | Campana, Jr. et al. |
| 6,330,618 B1 | 12/2001 | Hawkins et al. |
| D454,349 S | 3/2002 | Makidera et al. |
| D455,135 S | 4/2002 | Hyun |
| 6,370,518 B1 | 4/2002 | Payne et al. |
| 6,377,685 B1 | 4/2002 | Krishnan |
| D456,805 S | 5/2002 | Ono et al. |
| 6,396,482 B1 | 5/2002 | Griffin et al. |
| 6,397,078 B1 | 5/2002 | Kim |
| 6,421,707 B1 | 7/2002 | Miller et al. |
| 6,452,588 B2 | 9/2002 | Griffin et al. |
| 6,463,464 B1 | 10/2002 | Lazaridis et al. |
| 6,477,482 B1 | 11/2002 | Maupin et al. |
| 6,487,602 B1 | 11/2002 | Thakker |
| D466,877 S | 12/2002 | Hawkins et al. |
| D467,235 S | 12/2002 | Hawkins et al. |
| 6,489,950 B1 * | 12/2002 | Griffin et al. .......... 345/168 |
| 6,549,304 B1 | 4/2003 | Dow et al. |
| RE38,127 E | 5/2003 | O'Sullivan |
| 6,587,132 B1 | 7/2003 | Smethers |
| 6,606,082 B1 | 8/2003 | Zuberec et al. |
| 6,611,254 B1 | 8/2003 | Griffin et al. |
| 6,611,255 B2 | 8/2003 | Griffin et al. |
| 6,611,697 B1 | 8/2003 | Ewing et al. |
| 6,662,244 B1 | 12/2003 | Takahashi |
| 6,665,173 B2 | 12/2003 | Brandenberg et al. |
| 6,671,702 B2 | 12/2003 | Kruglikov et al. |
| 6,677,932 B1 | 1/2004 | Westerman |
| 6,701,378 B1 | 3/2004 | Gilhuly et al. |
| 6,705,520 B1 | 3/2004 | Pitroda et al. |
| 6,725,060 B1 | 4/2004 | Chhatriwala et al. |
| 6,727,830 B2 * | 4/2004 | Lui et al. .............. 341/20 |
| 6,727,916 B1 | 4/2004 | Ballard |
| 6,728,786 B2 | 4/2004 | Hawkins et al. |
| 6,741,235 B1 * | 5/2004 | Goren .............. 345/173 |
| 6,774,927 B1 | 8/2004 | Cohen et al. |
| 6,836,759 B1 * | 12/2004 | Williamson et al. ......... 704/235 |
| 6,856,809 B2 | 2/2005 | Fostick |
| 6,857,105 B1 | 2/2005 | Fox et al. |
| 6,867,763 B2 | 3/2005 | Griffin et al. |
| 6,873,317 B1 | 3/2005 | Griffin et al. |
| 6,874,011 B1 | 3/2005 | Spielman et al. |
| 6,874,037 B1 | 3/2005 | Abram et al. |
| 6,891,529 B2 | 5/2005 | Ladouceur et al. |
| 6,919,879 B2 | 7/2005 | Griffin et al. |
| 6,934,558 B1 | 8/2005 | Sainton et al. |
| 6,950,988 B1 | 9/2005 | Hawkins et al. |
| 6,957,397 B1 | 10/2005 | Hawkins |
| 6,961,584 B2 | 11/2005 | Leedom, Jr. |
| 6,975,304 B1 | 12/2005 | Hawkins et al. |
| 7,048,456 B2 | 5/2006 | Keinonen et al. |
| 7,054,441 B2 | 5/2006 | Pletikosa |
| 7,061,403 B2 | 6/2006 | Fux |
| 7,069,056 B2 | 6/2006 | Iwata et al. |
| 7,136,897 B1 | 11/2006 | Raghunandan |
| RE39,427 E | 12/2006 | O'Sullivan |
| 7,155,521 B2 | 12/2006 | Lahti et al. |
| 7,171,108 B1 | 1/2007 | Masters et al. |
| 7,218,242 B2 | 5/2007 | Scalisi et al. |
| 7,231,229 B1 | 6/2007 | Hawkins et al. |
| 7,260,390 B1 | 8/2007 | Skinner et al. |
| 7,313,389 B1 | 12/2007 | Sharp et al. |
| 7,356,361 B1 | 4/2008 | Hawkins et al. |
| 7,395,089 B1 | 7/2008 | Hawkins et al. |
| 7,444,172 B1 | 10/2008 | Lee et al. |
| 7,512,952 B1 | 3/2009 | Liu et al. |
| 7,577,920 B1 | 8/2009 | Hawkins et al. |
| 7,650,147 B2 | 1/2010 | Hawkins et al. |
| 7,681,146 B2 | 3/2010 | Hawkins et al. |
| 7,725,127 B2 | 5/2010 | Hawkins et al. |
| 8,208,620 B2 | 6/2012 | Hawkins et al. |
| 8,224,379 B2 | 7/2012 | Hawkins et al. |
| 8,254,565 B2 | 8/2012 | Hawkins et al. |
| 8,261,207 B2 | 9/2012 | Hawkins et al. |
| 8,433,314 B2 | 4/2013 | Hawkins et al. |
| 8,495,517 B2 | 7/2013 | Hawkins et al. |
| 8,538,478 B2 | 9/2013 | Hawkins et al. |
| 2001/0027121 A1 | 10/2001 | Boesen |
| 2002/0021311 A1 | 2/2002 | Schecter et al. |
| 2002/0036623 A1 | 3/2002 | Kano |
| 2002/0058533 A1 | 5/2002 | Nagel et al. |
| 2002/0063738 A1 | 5/2002 | Chung |
| 2002/0086702 A1 | 7/2002 | Lai et al. |
| 2002/0090934 A1 | 7/2002 | Mitchelmore |
| 2002/0097227 A1 | 7/2002 | Chu et al. |
| 2002/0097927 A1 | 7/2002 | Lee et al. |
| 2002/0120696 A1 | 8/2002 | Mousseau et al. |
| 2002/0126097 A1 | 9/2002 | Savolainen |
| 2002/0132633 A1 | 9/2002 | Johnson et al. |
| 2002/0158812 A1 | 10/2002 | Pallakoff |
| 2002/0186262 A1 | 12/2002 | Itavaara et al. |
| 2003/0001816 A1 | 1/2003 | Badarneh |
| 2003/0060900 A1 | 3/2003 | Lo et al. |
| 2003/0123627 A1 | 7/2003 | Pinard et al. |
| 2004/0047505 A1 | 3/2004 | Ghassabian |
| 2004/0070567 A1 | 4/2004 | Longe et al. |
| 2005/0044395 A1 * | 2/2005 | Staring et al. .............. 713/200 |
| 2006/0095849 A1 | 5/2006 | Vertaschitsch et al. |
| 2007/0188448 A1 | 8/2007 | Hawkins et al. |
| 2011/0230234 A1 | 9/2011 | Hawkins et al. |
| 2012/0244915 A1 | 9/2012 | Hawkins et al. |

FOREIGN PATENT DOCUMENTS

| | | |
|---|---|---|
| EP | 0611239 A1 | 8/1994 |
| EP | 0 813 328 A2 | 12/1997 |
| EP | 0898222 A1 | 2/1999 |
| EP | 0 840 934 B1 | 4/1999 |
| EP | 933908 A2 | 8/1999 |
| EP | 1071029 A2 | 1/2001 |
| EP | 1218814 B1 | 4/2003 |
| JP | H10215299 A | 8/1998 |
| KR | 100691359 | 2/2007 |
| WO | WO 94/10678 | 5/1994 |
| WO | WO 94/16408 | 7/1994 |
| WO | WO 96/01453 | 1/1996 |
| WO | WO 00/65445 | 11/2000 |
| WO | WO-0118638 A1 | 3/2001 |

OTHER PUBLICATIONS

Motorola V60i Wireless Phone User Manual, Personal Communications Sector, Motorola, Inc., 600 North U.S. Highway 45, Libertyville, Illinois (www.motorola.com), pp. 1 and 53. url=http://www.motorola.com/mdirect/manuals/v60i_TDMA_User_Manual_E.pdf.

Motorola Series 60g Wireless Phone User Manual, © 2001 Motorola, Inc., published by the Personal Communications Sector, 600 North U.S. Highway 45, Libertyville, Illinois (www.motorola.com), pp. 1-3.

Newton MessagePad Handbook, © 1994 Apple Computer, Inc., 1 Infinite Loop, Cupertiono, CA, pp. 14-19, 22 and 23. (www.apple.com).

Progue, D., "PalmPilot: The Ultimate Guide," O'Reilly, 2$^{nd}$ Edition, Chapter 1-4.

SyncML Sync Protocol, version 1.0.1, 2001, pp. 1-61.

United States Court of Appeals for the Federal Circuit: *Wireless Agents LLC v. Sony Ericsson Mobile Communications AB and Sony Ericsson Mobile Communications (USA), Inc.*, Decided Jul. 26, 2006, 7 pages.

*American Programmer*, N. Y., American Programmer, Inc. (Dec. 1991), pp. 4-33.

*At Last, Technology Harnesse [sic] One of the Most Powerf [sic] Forces known to Man.*, Foster City, GO Corporation, 1991, 14 pages.

(56) References Cited

OTHER PUBLICATIONS

AT&T New Release, *NCR Cuts Price of 3170 Notebook Computer 11 to 19 Percent* [online]. (Mar. 8, 1993), Retrieved from the Internet: <URL:http://www.att.com/press/0393/930308.nca.html> 2 pages.
BlackBerry Handheld Users Guide, Sep. 7, 1999.
BlackBerry Developer's Guide SDK User's Guide Version 2.0 (Data TAC), Jun. 12, 2000.
BlackBerry Desktop Software Installation and Getting Started Guide, Feb. 5, 1999.
BlackBerry Enterprise Server Software Installation and Getting Started Guide, Sep. 29, 1999.
Carr, R.M., *The Point of the Pen*, Byte (Feb. 1991, Reprinted), 10 pages.
Choi, H., *First Look: Samsung I300 Cellphone/PDA*, retrieved from internet www.techtv.com, Mar. 28, 2001.
Compaq Product Information, *iPAQ Pocket PC Options*, [retrieved Nov. 13, 2001], retrieved from internet: www.compaq.com/products/handhelds.
Cullen, A., *Connecting With Your EO Cellular Module*, Mountain View, EO, Inc., 1992, 1993, pp. ii-33.
Cullen, A., *Getting Started With Your EO Personal Communicator*, Mountain View, EO, Inc., 1992, 1993, pp. ii-74.
Cullen, A., *Lookup Guide to the EO Personal Communicator*, Mountain View, EO, Inc., 1992, 1993, pp. ii-320.
*Go Corporation Information Statement*, (Nov. 8, 1993), 114 pages.
Handspring Product Information: *VisorPhone The Springboard Module that Transforms your Visor into an Extraordinary Phone*, (2000).
Handspring, *Sprint and Airprime Delivery First Wireless CDMA Phone and Data Module for the Handspring Visor*, [retrieved Aug. 6, 2001], retrieved from internet www.handspring/pr59.jhtml.
Handspring VisorPhone Module User Guide, (2000-2001).
*IBM Selects Racotek Data/Voice Communications Services to Interface With Touchmobile Product*, PR Newswire (Jan. 25, 1993), 2 pages.
IBM Technical Disclosure Bulletin: *SimpleUser Interface to a Cellular Telephone*, Oct. 1995, pp. 349-350, [retrieved Jul. 5, 2001], retrieved from internet.
IBM Technical Disclosure Bulletin: *Inexpensive Personal Digital Assistant*, Apr. 1995, pp. 525-526, [retrieved Jul. 5, 2001], retrieved from internet.
*IBM TouchMobile Information and Planning Guide*, International Business Machines Incorporated (Mar. 1993), 20 pages.
*IBM TouchMobile Solution for Data Capture and Communication, Keeping Your Business Moving in the 90s*, International Business Machines Incorporated (Jan. 1993), 13 pages.
*IBM'S Touchmobile Helps Field Workers Collect Data at the Touch of a Finger*, PR Newswire (Jan. 26, 1993), 2 pages.
Kyocera's Smartphone Series, retrieved from internet www.kyocera-wireless.com, 2001.
MacNeill, D., *Messaging Card and NewtonMail: We Pick Up and Deliver*, On The Go Magazine [online]. (Oct. 13, 1993), Retrieved from the Internet: <URL:http://www.pencomputing.com/Newton/NewtonNotes2.html> 2 pages.
MacNeill, D., *Wireless Newton Technology Goes to Work*, On The Go Magazine [online]. (Sep. 8, 1993), Retrieved from the Internet: <URL:http://www.pencomputing.com/Newton/NewtonNotes1.html >2 pages.
Maki, K., *The AT&T EO Travel Guide*, N.Y., John Wiley & Sons, Inc., 1993, pp. iii-555.
Mossberg, W., *Samsung Embeds Cellphone Inside Palm in New I300 Device*, Aug. 30, 2001, [retrieved Oct. 26, 2001], retrieved from internet http://www.ptech.wsj.com/archive/ptech-20010830.html.
Newspaper Article: *Ways to Escape Multiple-Remote Hell*, San Jose Mercury News, Jun. 14, 2001.
Nokia 9110 Accessories Quick Guide Instruction Manual, 1999.
Schlender, B. R., *Hot New PCs That Read Your Writing, Fortune* (Feb. 11, 1991, Reprinted), 6 pages.
Sprint PCS User Guide—Samsung Model SCH-8500, 1999.
Stock, R., *The World of Messaging an Introduction to Personal Communications*, Mountain View, EO, Inc., 1992, 1993, pp. ii-69.
SyncML Website Introduction Page, SyncML Initiative LTD., [Retrieved on Oct. 24, 2002]. Retrieved from the Internet: <URL: http://www.syncml.org/about-intro.html>, 2 pages.
SynML Sync Protocol [Retrieved on Dec. 7, 2000]. Retrieved from the Internet: <URL:http://www.syncml.org/docs/syncml_protocol_v10_20001207.pdf>, 60 pages.
SynML Sync Protocol Version 1.0.1 [Retrieved on Jun. 15, 2001]. Retrieved from the Internet: <URL:http://www.syncml.org/docs/syncml_protocol_v101_20010615.pdf>, 61 pages.
Tam, P., "Palm, Motorola to Make PDA Cell Phones", Sep. 25, 2000, [retrieved Jun. 19, 2001], retrieved from internet http://www.zdnet.com/zdnn/stories/news/0,4586,2631800,00.html.
Technical White Paper BlackBerry Enterprise Edition for Microsoft Exchange, Version 2.1, (1999-2001).
Technical White Paper BlackBerry Enterprise Server for Microsoft Exchange, Version 2.1, (1997-2001).
Tucows PDA Phone GSM Dailer: GSM Dailer 1.0, Nov. 30, 2000, [retrieved Jun. 19, 2001], retrieved from internet http://pds.rcp.net/pe/pocket/preview 154208.html, Jun. 19, 2001.
User's Guide, hp iPAQ Pocket PC h4000 Series, Document Part No. 343434-001, Aug. 2003, 141 pages.
Wireless Application Protocol, Service Loading, WAP-168-ServiceLoad-20010731-a, Version Jul. 31, 2001, 18 pages.
Wireless Application Protocol, Service Indication, WAP-167-Servicelnd-20010731-a, Version Jul. 31, 2001, 28 pages.
Wireless Application Protocol, Push Message, WAP-251-PushMessage-20010322-a, Version Mar. 22, 2001, 14 pages.
Wireless Application Protocol, WAP-Sync-Spec, Data Synchronisation Specification, WAP-234-SYNC-20010530-a, Version May 30, 2001, 11 pages.
Wireless Application Protocol, Wireless Application Protocol, Wireless Markup Language Specification Version 1.3, WAP WML, WAP-191-WML, Feb. 19, 2000, 110 pages.
U.S. Appl. No. 07/831,671.
U.S. Appl. No. 09/670,696.
U.S. Appl. No. 09/813,165.
U.S. Appl. No. 09/835,464.
U.S. Appl. No. 09/953,211.
United States Office Action, U.S. Appl. No. 11/740,704, Sep. 9, 2010, 13 pages.
United States Office Action, U.S. Appl. No. 11/740,704, May 3, 2010, 9 pages.
United States Office Action, U.S. Appl. No. 11/740,704, Mar. 12, 2010, 8 pages.
Barnett S., "VisorPhone: Phone and PDA Merge Into One," Pen Computing Magazine, Jan. 22, 2001, 6 pages, [Online] [Retrieved on Jul. 16, 2009] Retrieved from the Internet<URL:http://www.pencomputing.com/palm/Pen38/visorphone.html>- ;other.
BlackBerry Enterprise Server Software Installation and Getting Started Guide, Aug. 29, 1999.
BlackBerry Handheld Users Guide, Aug. 7, 1999.
Disabatino J., "Hands Full of Information," Computerworld, Nov. 6, 2000, vol. 34 (45), p. 68.
IBM Technical Disclosure Bulletin: Inexpensive Personal Digital Assistant, retrieved from internet, Apr. 2001.
IBM Technical Disclosure Bulletin: SimpleUser Interface to a Cellular Telephone, retrieved from internet, Oct. 2001.
MacNeill, D. "Wireless Newton Technology Goes to Work", On The Go Magazine, Oct. 13, 1993, 2 pages, http://www.pencomputing.com/Newton/NewtonNotes2.html.
Motorola Model 009 "Let's Start" Guide, pp. 1, 3, 11, 2001.
Motorola Model 009 User's Guide, pp. 1, 3, 22, 23, 80. 2002.
Motorola Model V100 User's Guide, pp. 1, 2, 17-19, 33. 2001.
Orubeondo A., The new shape of mobile communication, InfoWorld, Apr. 23, 2001, pp. 65-66.
Palencher, J., "New Phones Deliver PIM Function," Twice, Oct. 9, 2000, p. 44.
Pinkerton J., Wireless meets computing again, Dealerscope, Nov. 2000, vol. 42 (11), pp. 34-35.

* cited by examiner

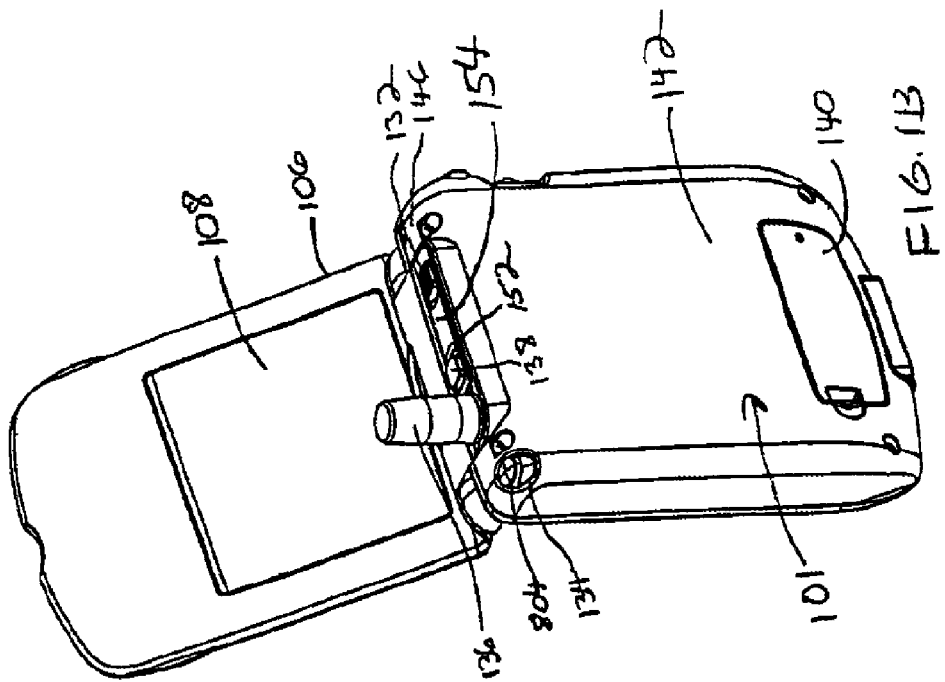
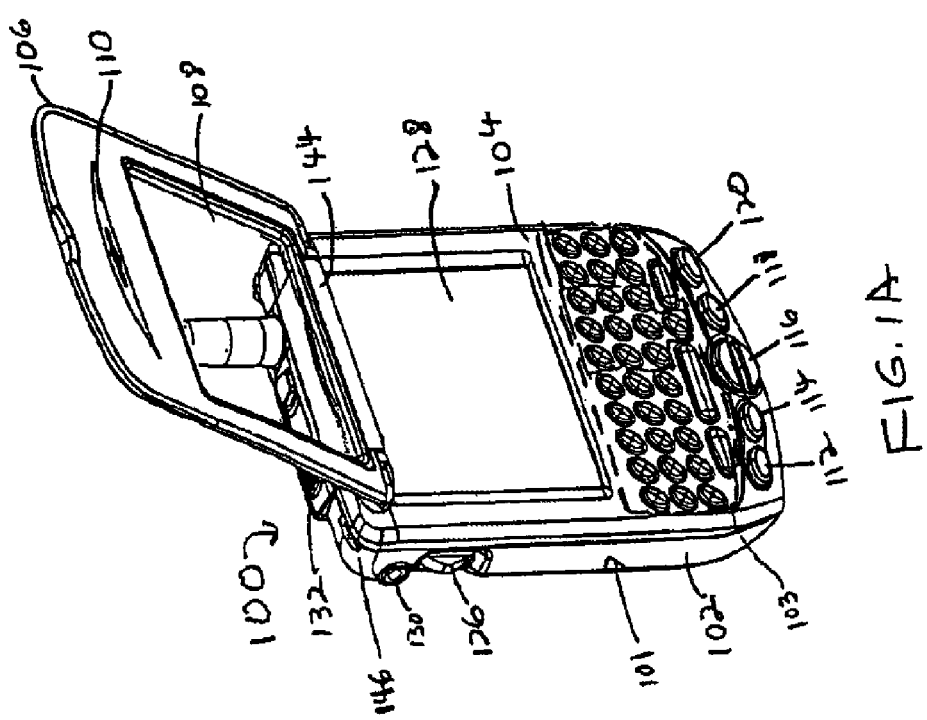

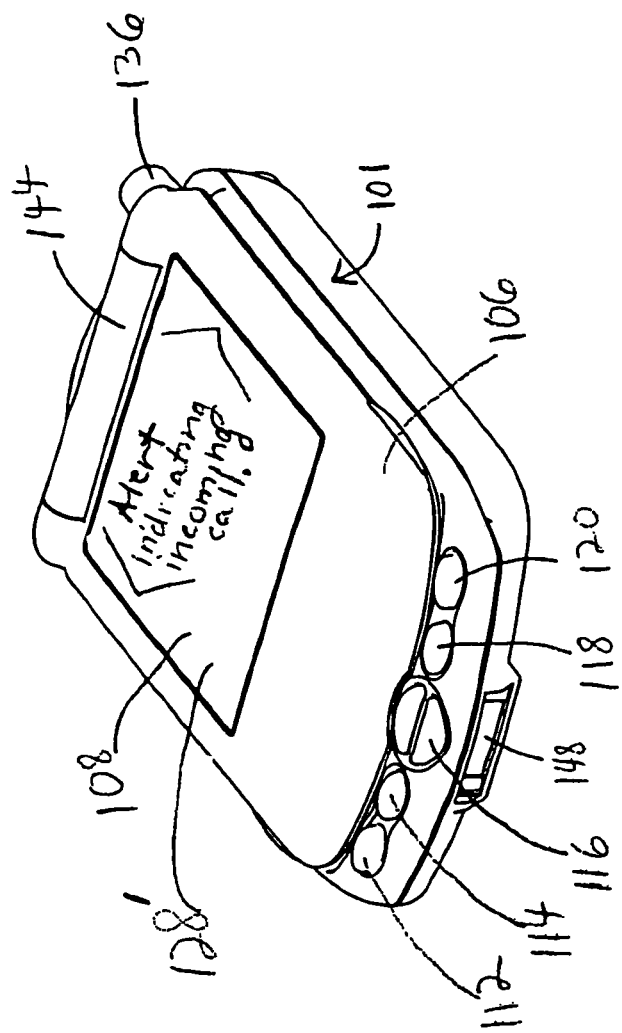

FIG. 6D

Display of First Alternate Symbol Replacing Base Symbol

Type List for "e"

New Message
To: Rob Haitani
CC:
Subj: Lunch
Body: Let's go to Erik's Deli café

(Send) (Cancel) (Details...)

Display of Second Alternate Symbol Replacing Base symbol

Type List for "e"

New Message
To: Rob Haitani
CC:
Subj: Lunch
Body: Let's go to Erik's Deli café

(Send) (Cancel) (Details...)

Display of Third Alternate Symbol Replacing Base Symbol

Type List for "e"

New Message
To: Rob Haitani
CC:
Subj: Lunch
Body: Let's go to Erik's Deli café

(Send) (Cancel) (Details...)

INTERFACE FOR PROCESSING OF AN ALTERNATE SYMBOL IN A COMPUTER DEVICE

CROSS-REFERENCE TO RELATED APPLICATION

This application is a continuation of U.S. patent application Ser. No. 09/977,870, for "Interface for Processing of an Alternate Symbol in a Computer Device," filed Oct. 14, 2001 now U.S. Pat. No 6,975,304, which claims priority under 35 U.S.C. 119(e) from U.S. Provisional Patent Application Ser. No. 60/297,817, for "Handheld Device," filed on Jun. 11, 2001. The disclosures of these applications are incorporated herein by reference.

BACKGROUND OF THE INVENTION

1. Field of the Invention

The present invention relates generally to systems and methods for symbol processing by a computing device, in particular a hand-held computing device.

2. Description of the Related Art

The integration of services into computer devices, including hand-held devices such as personal digital assistants, often involves an increased cost of time to the user to adapt to a new man-machine interface. The man-machine interface aspect of the data entry mechanisms is crucial to decreasing the learning curve time customers need to fully utilize the device for performing its various functions in order to decrease customer frustration. The ease of manipulation of data entry mechanisms enhances the overall device experience.

It is desirable to strike an appropriate balance between burdening the user with a bulkier device on the one hand with dedicated data entry mechanisms as part of the physical interface and on the other hand, providing a more limited man-machine interface requiring the user to have to learn more data entry techniques or to consume more time for data entry.

One example of how a limited man-machine interface can be time consuming occurs when a user desires to enter a character that is not located as part of the physical interface such as a keyboard or an initial view of a display presented to a user for entering text. For example, in trying to find an accented "ê" version of the letter "e", typically the user must go to a separate display of a table of all accented characters and search through one or more displays of accented characters carefully so as not to miss the one for which he is looking. Otherwise, the user can memorize special key sequences. A more pleasant and robust text entry experience that gives the user easy access to a wide range of symbols is highly desirable.

The man-machine interface impacts the acceptability of the device to users because it impacts the extent of services provided, the effective use of the services, and the overall reliability of the device.

SUMMARY OF INVENTION

The present invention provides for a system and method for processing alternate symbols associated with or linked to a base symbol in a computer device. Examples of computer devices that may embody the system or method are hand-held computing devices.

A base symbol is a symbol to which at least one alternate symbol is linked. A base symbol commonly appears on a key of a keyboard, a display of a keyboard, or is a handwritten symbol recognized by handwriting entry software. Examples of alternate symbols are accented characters and punctuation marks that do not appear on a keyboard or are not commonly recognized by a handwriting entry program, and short symbol sequences. An example of a common short symbol sequence is an emoticon used in e-mail messages to convey tone or feelings.

In one embodiment of a system for performing the invention, the system comprises a display, a memory, a processor coupled to the display and memory, and software for processing alternate symbols which may be stored in the memory, an example of a computer usable medium, and executed by the processor.

One embodiment of a computer-implemented method in accordance with the invention comprises receiving input indicating a request for an alternate symbol associated with a base symbol and displaying a list of at least one alternate symbol associated with the base symbol.

As a base symbol may have more than one alternate symbol associated with it, a base symbol may have a list of alternate symbols associated with it. In one embodiment, the list of alternate symbols and information associated with the list are stored in a memory. However, the list and/or information associated with the list may be updated in the memory according to criteria. In one embodiment, the criteria may be based on prior usage, and in another, the criteria may be user-defined.

BRIEF DESCRIPTION OF THE FIGURES

The figures depict one or more embodiments of the present invention for purposes of illustration only. One skilled in the art will readily recognize from the following discussion that alternative embodiments of the structures and methods illustrated herein may be employed without departing from the principles of the invention.

FIG. 1A illustrates a front perspective view of an embodiment of a hand-held computing device with a lid opened in an extended position in accordance with the present invention.

FIG. 1B illustrates a back perspective view of an embodiment of a hand-held computing device with a lid opened in an extended position in accordance with the present invention.

FIG. 1C illustrates a view of the front side of the embodiment of the hand-held device of FIG. 1A in a lid closed state in accordance with the present invention.

FIG. 6D illustrates a fourth example of a display of at least one alternate symbol associated with a base symbol

DETAILED DESCRIPTION

Figure 2:
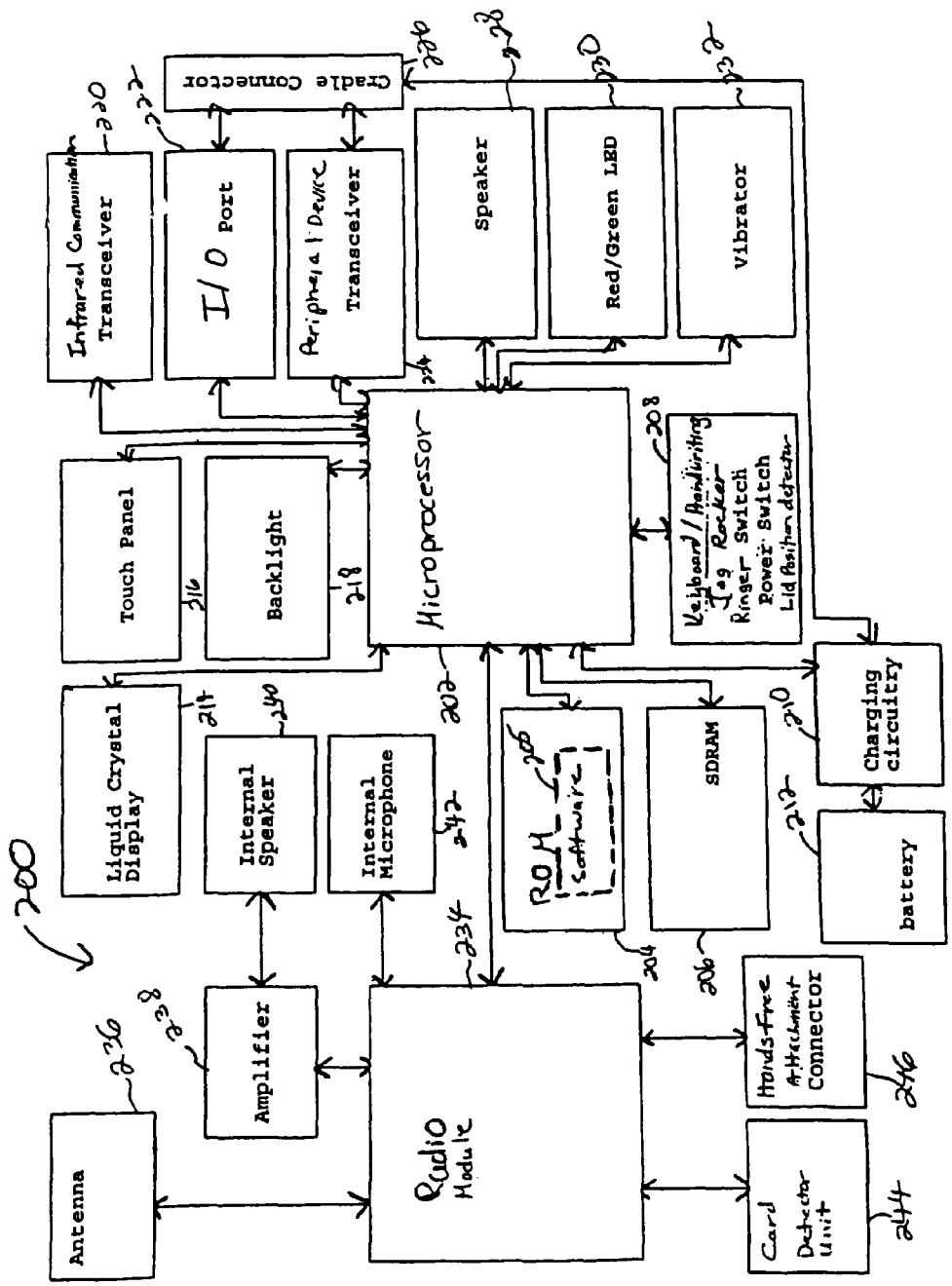
FIG. 2 illustrates a block diagram of an embodiment of a system enclosed within the case of the hand-held device comprising hardware and software for performing functions including functions related to communication services and symbol processing.

FIG. 1A illustrates a front view of an embodiment of a hand-held computing device with a lid opened in an extended position in accordance with the present invention. The embodiment of a hand-held device 100 depicted in FIG. 1A comprises a case 101 having a front side 104, and sides, for example, a first side 102. The front side 104 comprises a display 128, in this embodiment a liquid crystal display (LCD) that is a touch-sensitive display. For example, the touch-sensitive display may include a digitizer. A user may use his or her finger or a stylus for data entry, for example, by indicating selections from a menu. In one embodiment, the display is a color display that displays color images. The front side 104 also comprises a keyboard 103, e.g. a QWERTY keyboard. User input devices embodied as application buttons 112, 114, 116, 118 and 120 are also shown. In this embodiment, one of the application buttons 112 is associated with a telephone application. Another application button 114 is associated with a calendar application. Another application button 116 is associated with a scroll-up, scroll-down feature. Another application button 118 may launch an Internet access application. An application button may be associated with more than one function or more than one application. In another example, an application button 120 may be associated with a messaging service, examples of which are electronic mail, e-mail, and Short Messaging Service (SMS).

Attached to the front side 104 above the display 128 is a lid 106. In this embodiment, the lid 106 is a flip lid that is hinged 144 above the display. The lid includes a transparent portion 108 through which a user can see the display even if the lid is closed. The lid 106 further has a speaker 110 in this embodiment.

As illustrated in this embodiment, the first side 102 includes a user input device, in this embodiment, a jog rocker 126. Also included on the side 102 of the device is a plug-in socket 130 for a hands-free speaker attachment. Examples of a hands-free speaker attachment may include a full headset or a single earpiece.

FIG. 1B illustrates a back side 142 of the embodiment of the hand-held device of FIG. 1A. Also shown is a top part 146 having an antenna 136, and a ringer switch 132 which interact with a radio module (See FIG. 2 234) inside of the case that provides for radio communications including cellular telephone functionality. In this embodiment, a power switch 138 is shown on the upper portion of the device. In this embodiment, a two-color light emitting diode (LED) 152 is shown on the upper portion of the device. In this embodiment, an infrared panel port 154 is shown on the upper portion of the device. The top part of the device includes an opening of a stylus holder 134. The stylus holder 134 extends cylindrically down the back side of the device. In this illustration of an embodiment of the device, a stylus is seated in the device as illustrated by a head 804 of the stylus. In addition, the back side 142 is shown in this embodiment to comprise a door 140. The door holds an identification card. One example of such an identification card is a subscriber identification module (SIM) card typically used with portable telephones used within the Global System for Mobile (GSM) communications networks. This feature allows the user to place the card in another device. For example, if a user is on another continent, the user can slip the card into another voice communication device such as a telephone designed to work at the frequencies allocated for that continent, country or group of countries.

FIG. 1C illustrates a view of the front side of the embodiment of the hand-held device of FIG. 1A in which the lid 106 is in a closed position. The lid extends over the keyboard and the display in the closed position. The lid having a transparent portion 108 provides a convenience to the customer and protection to the display of the device at the same time. For example, an alert of an incoming call notification is displayed on the display which is visible through the transparent lid. In this way, the lid also provides a protective cover of the device's display.

The case 101 encloses logic, for example hardware and/or software, for providing communication services and logic for symbol processing. Examples of symbols are letters, numbers, punctuation marks, emoticons typically used in e-mail messages, shortcut function keys, and mathematical symbols. An example of communication services is voice communications. FIG. 2 illustrates a block diagram of an embodiment of a system 200 comprising units making up the hardware and/or software for performing these functions. The system may be implemented in a printed circuit board. The system comprises a microprocessor 202, a read only memory (ROM) 204, a synchronous dynamic random access memory (SDRAM) 206, a user interface unit 208 for processing input from the keyboard 103 or a handwriting area (see FIG. 7, 702), the jog rocker 126, the ringer switch 132 and the power switch 138. Also this unit 208 detects the state of the lid position to determine if the lid is closed or open. Connected to the microprocessor as well is charging circuitry 210 for providing power from the battery 212. In one embodiment, the microprocessor is a DRAGONBALL™ VZ MC68VZ328 33 MHz processor. In one embodiment, the battery is a Li-Ion 600 mAH battery. The charging circuitry is also connected to a cradle connector 226. The microprocessor is also connected with a liquid crystal display unit 214, a touch panel unit 216 and a backlight unit 218. The microprocessor 202 is also connected to a peripheral device transceiver 224, an example of which is a Universal Serial Bus (USB) transceiver, and an input/output (I/O) port 222, an example of which is an EIA-232 or a RS-232 port, both of which are also connected to the cradle connector 226. The microprocessor 202 is also connected to an infrared communication transceiver 220, an example of which is an Infrared Data Association (IrDA) transceiver. The microprocessor is also connected with speaker unit 228, an example of which is a piezo speaker, a red/green light emitting diode (LED) 230 unit, and a vibrator unit 232.

The microprocessor is also connected to a radio module 234 that provides for radio communications including cellular telephone functionality. An example of a radio module that may be used is a Wavecom Wismo GSM Module. Other services provided include Internet access and text messaging. An example of a text messaging service is the Short Message Service (SMS) which provides for sending and receiving short text messages from the hand-held computing device to another communication device, for example a personal digital assistant or a mobile phone.

The radio module is connected to an antenna 236, an amplifier 238 which is also connected to an internal speaker 240. The radio module is also connected to an internal microphone 242 as well as a card detector unit 244 and a hands-free attachment connector 246.

Those of skill in the art will understand that logic, for example hardware and/or software, enclosed within the device, for example the system depicted in FIG. 2, processes input from user input devices in different forms and performs functions with respect to the input. For example, the user interface unit 208 may be embodied in hardware and/or software under the control of the microprocessor 202. The microprocessor 202 may execute software instructions for receiving input and responding to it appropriately from software application programs 205 stored in a memory such as read only memory 204, and/or random access memory such as the illustrated SDRAM 206, and/or in the user interface unit 208.

A keyboard, such as a QWERTY keyboard, is advantageous for e-mail and other forms of electronic messaging in a hand-held device because data entry using a keyboard is more accurate than data entry using handwriting recognition software.

Figure 3A:
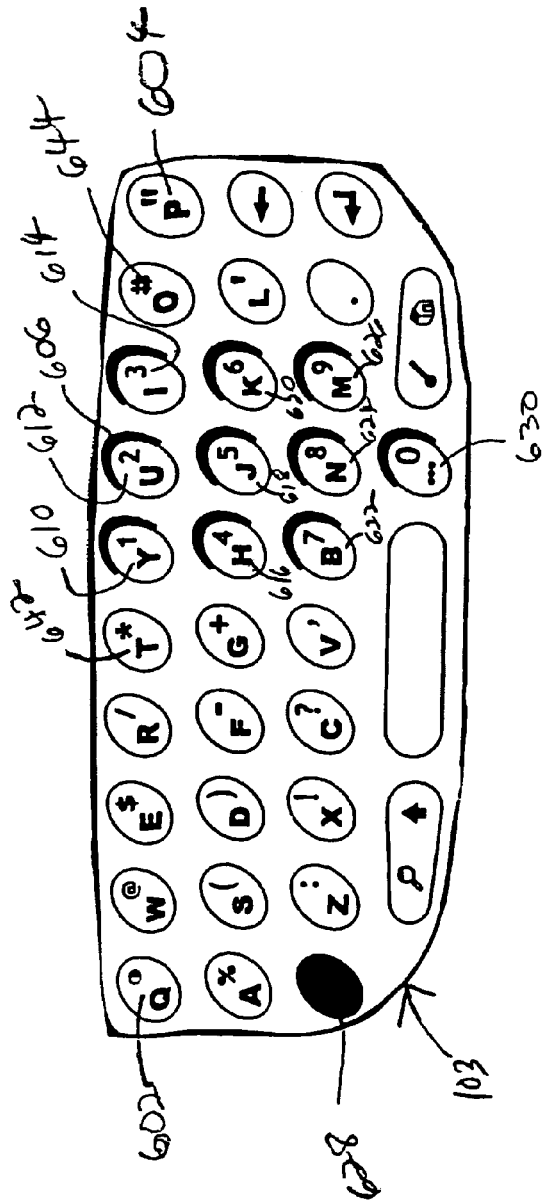
FIG. 3A illustrates an embodiment of a QWERTY keyboard of the hand-held device in accordance with the present invention.

In one version of the invention, a version of a QWERTY keyboard is used. For example, FIG. 3A illustrates an embodiment of a keyboard 103 that may be part of a hand-held computing device. The keyboard comprises the following keys: the letters a-z (26 keys), punctuation marks such as a period "." key. In one embodiment, the " . . . " symbol key 630 is a dedicated key for processing related to a request for an alternate symbol linked to a base symbol. Keys are also provided for such functions as "Space", "Return", "Backspace", as well as a "Shift" key, an "Option" key, and a "Menu/Command" key. It will be noted that beginning in the top row at the left side, the first six letters from left to right are "qwerty". The keys may be hardware keys or part of a displayed keyboard.

This embodiment includes an option key 628. Responsive to receiving input indicating that an option state is in effect, an option symbol associated with a key will be displayed responsive to receiving input indicating activation of the key. As shown, an option symbol associated with a key is displayed on the key. For example, as shown, normal symbol keys "y", "u" and "i" have respectively as their option symbols "1", "2" and "3".

Figure 3B:
FIG. 3B illustrates an embodiment of a layout of application buttons on the hand-held device.

FIG. 3B illustrates an embodiment of the layout of the application buttons of the hand-held device. In this embodiment, one of the application buttons 632 is associated with a telephone application. Another application button 634 is associated with a calendar application. Another application button 636 is associated with a scroll-up, scroll-down feature. For example, a user may use this feature to scroll through entries in a menu. In this embodiment, application button 638 is associated with an application that provides Internet access. In this embodiment, an application button 640 is associated with a messaging application.

Figure 4:
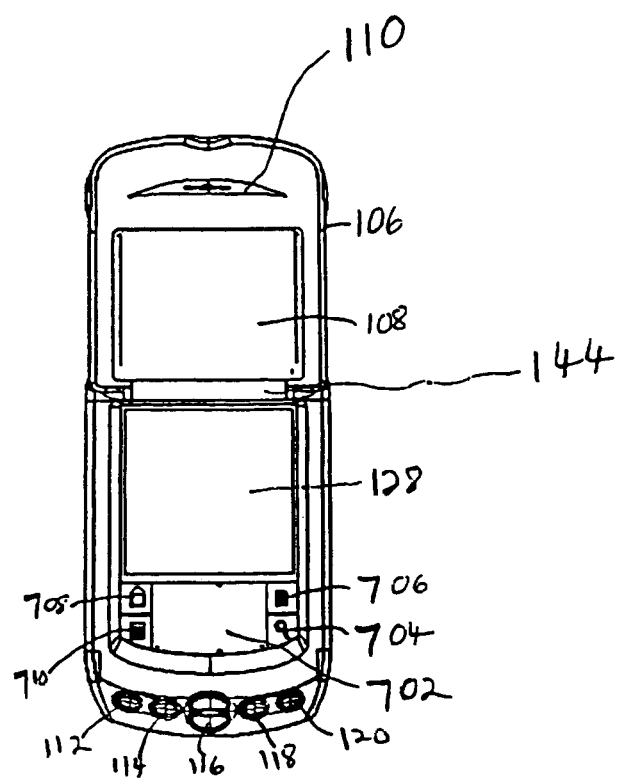
FIG. 4 illustrates an embodiment of the hand-held device comprising a handwriting area upon which a user can enter symbols through the use of a display data entry device such as a stylus or his or her finger.

FIG. 4 illustrates another version of the embodiment of the hand-held device of FIGS. 1A, 1B and 1C. In the version of FIG. 4, the device comprises a handwriting area 702 upon which a user can enter symbols through the use of a stylus or his or her finger or other display contact data entry device. The icons surrounding the handwriting area are those typically used with the GRAFFITI™ program typically implemented in PALM OS® devices. The icons when tapped perform a function associated with the icon. For example, an applications icon 708 opens applications when tapped. The other icons are the menus icon 710, the calculator icon 706, and the find function icon 704 which allows a user to find text anywhere in his data. In the lid-closed position of the device, the embodiment of FIG. 4 would appear as the embodiment of the device having a transparent lid 108 in the closed position as illustrated in FIG. 1C. This embodiment of a hand-held device also comprises a system such as the example illustrated in FIG. 2 comprising logic, for example hardware and/or software, for providing communication services and symbol processing. For example, this device also includes radio communications functionality, for example, cellular telephone functionality as discussed above.

The number of symbols that can be displayed on a keyboard including displayed keyboards cannot typically cover every symbol. For example, a symbol such as the letter "e" is not typically available in a plurality of accented versions on a keyboard layout for the English language. Besides desiring to include in a message a different version of a symbol, a user may desire to find a symbol of the same type as one available on a keyboard. For example, a user may need the symbol for the Japanese yen, a symbol of the same type as the U.S. dollar sign "$" typically available on keyboards or accepted by handwriting recognition software. Furthermore, a user may desire to use a symbol having a relationship or connection with a symbol he has typed. Examples of relationships or connections may be logical relationships, relationships by association, or user-defined relationships. For example, the trademark symbol, ™ may be an alternate symbol linked to the letter "T". One association is that the symbol visually includes the letter. Another association is that the name of the symbol commonly used, e.g. "trademark symbol" begins with the base symbol. In another example, a command symbol that causes an action may also be an associated alternate symbol. An example of a command symbol is a <shortcut> symbol key, such as one that causes input to be received, the input indicating a command or request that is also associated with the activation of a sequence of keys or displayed items. Shortcut symbols may be associated with the letter "S" because shortcut begins with "S". Additionally, a shortcut symbol may be an alternate symbol associated with one or more of the base symbols represented by the keys or displayed items in the sequence.

Another kind of association or connection based relationship is a visual association relationship. For example, the British pound symbol "£" may also be associated with the letter "L" because they look similar. They may be visually associated because the both have a vertical line at the bottom of which another line protrudes in a general horizontal direction.

The relationship may also be context related. For example, the calendar application software may provide a list of alternate symbols including alternate symbols appropriate for the calendar application. For example, for the letter "j", short symbol sequences of the words "June" and "July" may be provided in the list.

A base symbol is a symbol to which at least one alternate symbol is linked. A base symbol commonly appears on a key, or is displayed in an initial view of a display for text entry or is a handwritten symbol recognized by handwriting entry software. Examples of alternate symbols are accented characters, punctuation marks that do not appear on a keyboard, and short symbol sequences. An example of a common short symbol sequence is an emoticon used in e-mail messages to convey tone or feelings.

Figure 5:
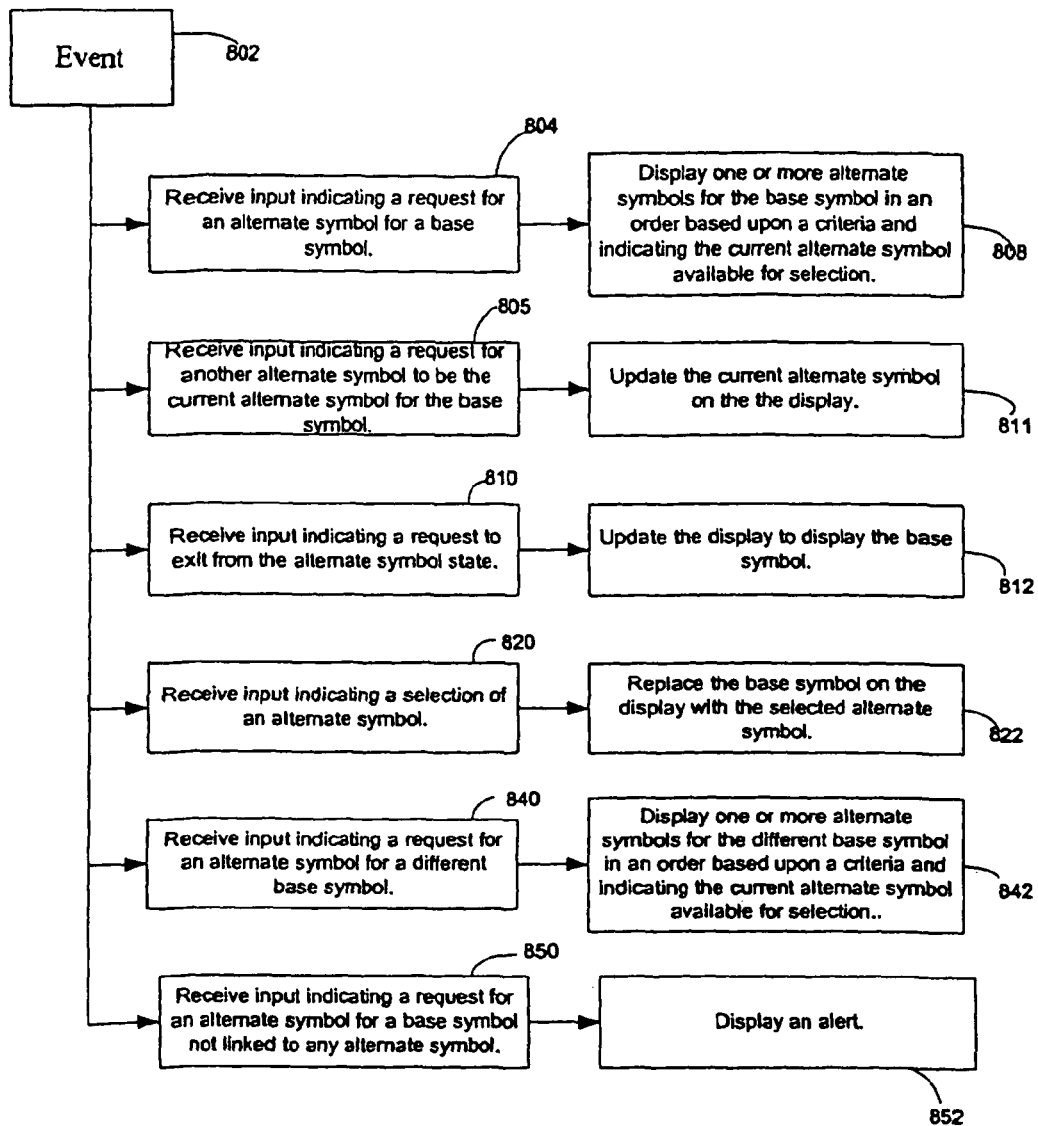
FIG. 5 illustrates an event flow diagram of an embodiment of one or more actions for providing symbols in an alternate symbol state.

FIG. 5 illustrates an event flow diagram of an embodiment of one or more actions for providing alternate symbols associated or linked with a base symbol. In one embodiment, the one or more actions may be implemented by the microprocessor 202 executing software instructions causing the actions described. Those of skill in the art will recognize that one or more of the methods may be implemented in embodiments of hardware and/or software and combinations thereof. For example, instructions for performing the one or more actions may be embodied within a computer usable medium.

Upon the occurrence of the event of receiving 804 input indicating a request for one or more alternate symbols linked to a base symbol, at least one alternate symbol for is displayed 808 for the base symbol. The order in which the alternate symbols are displayed may be based upon a criteria. A user may request an alternate symbol display view by typing a key sequence, for example <option><space> after entering a base symbol. Also, a sequence of contacts with a stylus or finger on a screen icon or a portion of the screen such as that displaying the base symbol may be detected to indicate a request. Requests may also be indicated by pressing a key dedicated for processing alternate symbols such as the " . . . " key 630 displayed on the keyboard in FIG. 3A. Or the user may request an alternate symbol for a base symbol by holding a key representing the base symbol down or maintaining a display contact for a designated amount of time.

Figures 6A, 6B, 6C:
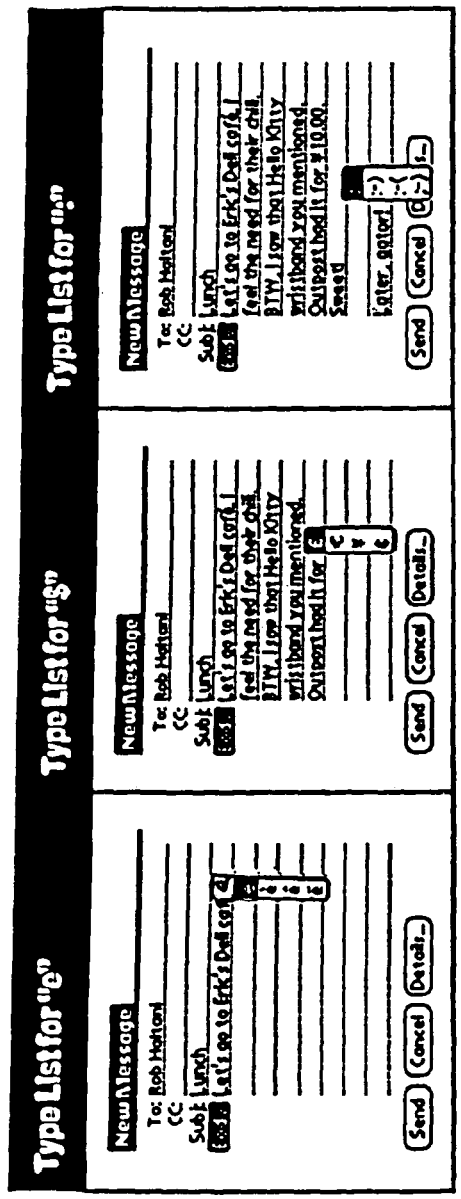
FIG. 6A illustrates an example of a display of at least one alternate symbol associated with a base symbol.
FIG. 6B illustrates another example of a display of at least one alternate symbol associated with a base symbol
FIG. 6C illustrates a third example of a display of at least one alternate symbol associated with a base symbol

Each of FIGS. 6A, 6B and 6C illustrate an example of a view of at least one alternate symbol associated with a base symbol. In each of these examples, the view is embodied as a pop-up menu displaying a list of alternate symbols. FIG. 6A illustrates a pop-up menu of a plurality of accented versions of the base letter "e". In the example of FIG. 6A, the base symbol "e" appears at the top of the pop-up menu followed by a list of alternate symbols associated with the base symbol. FIG. 6B illustrates another version of a pop-up menu of symbols of the same type as the "$". For example, the symbol "£" for the British pound and the symbol "¥" for the Japanese yen are also displayed. The current alternate symbol available for selection is indicated in this example by highlighting. FIG. 6C illustrates a pop-up menu display of examples of alternate symbols that have a logical or associational connection with the base symbol of colon ":" that the user has typed. The semi-colon ";" and the emoticons ":-)" indicating a smile or happiness, ":-(" indicating sadness, and the ";-)" typically associated with a smile with a wink or tongue in cheek expression. The semi-colon is typically associated with a colon either by sharing a common syllable or being on the same key in typical desktop keyboard. By association, the tongue in cheek emoticon uses a semi-colon so it is also linked or associated with the colon. The other displayed emoticons have a colon as part of their short sequences of symbols so they are logically or associationally connected to the colon.

In another embodiment illustrated in FIG. 6D, the display is updated showing the base symbol replaced by a current alternate symbol. Responsive to receiving 805 input indicating a request for another alternate symbol to be the current alternate symbol for the base symbol, the display is updated 811 to indicate another current alternate symbol for the base symbol. The user may request another alternate symbol to be the current alternate symbol by pressing the dedicated key, or using the scroll button or the jog rocker scroll functionality. The alternate symbol may be indicated as the current alternate symbol that may be selected for the base symbol by highlighting it in the pop-up list or by replacing the base symbol with it on the screen.

Similarly, in another embodiment, a base symbol may have an alternate symbol such as a sequence of symbols or other symbols that are added to the base symbol. For example, the alternate symbols linked with the base symbol "." may include "com", "org", "biz", or "net" which are added after the period. The association of the period with these short symbol sequences is their common use in the same website name. The period is often called "dot" in this context. In natural language also, the "period" has become associated with the phrase "dot.com" to refer to a business type. Alternatively, the alternate symbols can include the symbol so that the symbol is replaced by the complete sequence. An example of this is the smile or happy emoticon linked to the base symbol, the colon.

Upon the occurrence of the event of receiving 820 input indicating selection of an alternate symbol for the base symbol, the base symbol is replaced 822 with the selected alternate symbol on the display. In one embodiment, a user may select an alternate symbol from a display by typing another symbol so that the alternate symbol is displayed and is followed by this other symbol. In other embodiments, the user may select an alternate symbol by using a specific key sequence or tapping the display either anywhere or in a specific location, for example with a finger or stylus. In other embodiments, examples of other keys that may be used to indicate selection are a <return> key, an <enter> key, or a <space> key. Alternatively, activating the jog rocker, for example by pressing it, may be used.

Upon the occurrence of receiving 810 input indicating a request to exit from the alternate symbol state, the display is updated 812 to display the base symbol. In one embodiment, the user may select the alternate symbol and type another symbol such as the next character in the sentence in order to exit the alternate symbol state. Also other examples of keys or key sequences that may be used to select an alternate symbol and exit the alternate symbol state include the <return> key, the <space> key, the jog rocker, or a tap on the desired alternate symbol displayed on the touch-sensitive display. However, a user may desire to leave the alternate symbol state without selecting an alternate symbol. In one embodiment, receiving input indicating activation of the <backspace> key causes an exit from the alternate symbol state.

In the event of receiving 850 input indicating a request for an alternate symbol for a base symbol not linked to any alternate symbol, an alert is displayed 852. Alerting the user may be performed in one way by displaying a message to the user. In another way, the user may be alerted by an audio sound such as a beep.

A user may not find the alternate symbol she was looking for in the list linked to the current base symbol. The user may desire to browse lists of alternate symbols associated with other base symbols. Responsive to the event of receiving 840 input indicating selection of a different base symbol while in the alternate symbol state, a view, such as a pop-up menu, of alternate symbols for the different base symbol is displayed 842.

The order of the list of one or more alternate symbols associated with a base symbol may be displayed based on different criteria. Information associated with the list may be stored with the list indicating a relationship to the criteria. For example, the information may be embodied as a header associated with the list. For example, one example of criteria is that the most common alternate symbol based on statistics may be displayed first. Such statistics may be pre-determined statistics based on general usage or surveys of all users. Alternatively, the order may be based on prior usage or context. For example, for each alternate symbol in a list, a frequency selection indicator may be associated with an alternate symbol to indicate the frequency with which that alternate symbol is selected. An example of a frequency selection indicator is a count of the number of selection times for a session or over the lifetime of the device. The alternate symbol with the highest frequency count is displayed first. Alternatively, the last selected alternate symbol may be the criteria for determining which alternate symbol is displayed first for a base symbol. The content of the list may also be configured based on these suggested criteria and others. For example, the list may be localized for a particular language. For example, devices for French language usage may have different symbols or a different order than those set-up for German language usage. Of course, either or both of the order and content may also be user configurable in other embodiments.

The above description is included to illustrate the operation of one or more embodiments and is not meant to limit the scope of the invention. The scope of the invention is to be limited only by the following claims. From the above discussion, many variations will be apparent to those skilled in the art that would yet be encompassed by the spirit and scope of the invention.

What is claimed is:

1. In a mobile computing device having a telephone functionality, a computer-implemented method comprising:
   receiving keyed input requesting a base symbol for insertion into textual content on a display of the computing device;
   receiving keyed input requesting one or more alternate symbols associated with the base symbol, wherein the one or more alternate symbols are accented versions of the base symbol;
   displaying, simultaneously on the display, the one or more alternate symbols and the base symbol; and
   responsive to a user selection of one of the displayed alternate symbols, replacing the base symbol with the selected alternate symbol in the textual content.

2. A mobile computing device having telephone functionality for providing one or more alternate symbols associated with a base symbol, the mobile computing device comprising:
   a display;
   a memory;
   a processor coupled to the display and the memory;
   a user input mechanism; and
   a computer program stored in the memory, the computer program including instructions that, when executed by the processor, cause the mobile computing device to:
      receive, through the user input mechanism, a request to display the base symbol for insertion at a cursor location;
      receive, through the user input mechanism, a request to display the one or more alternate symbols associated with the base symbol, wherein the one or more alternate symbols are accented versions of the base symbol;
      display the one or more alternate symbols and the base symbol at the same time on the display; and
      responsive to a user selection of one of the displayed alternate symbols, replace the base symbol with the selected alternate symbol.

3. A computer-useable non-transitory medium storing instructions that, when executed by a processor of a mobile computing device, cause the mobile computing device to perform operations comprising:
   receiving, through a user input mechanism, a request to display a base symbol for insertion into textual content on a display of the computing device;
   receiving, through the user input mechanism, a request to display one or more alternate symbols associated with the base symbol, wherein the one or more alternate symbols are accented versions of the base symbol;
   displaying the one or more alternate symbols and the base symbol at the same time on the display; and
   responsive to a user selection of one of the displayed alternate symbols, replacing the base symbol with the selected alternate symbol.

4. The method of claim 1, wherein the displaying comprises:
   displaying a menu in a portion of the display, the menu including the one or more alternate symbols.

5. The method of claim 4, wherein displaying the menu comprises:
   determining a location of the base symbol; and
   displaying the menu, wherein at least a portion of the menu is adjacent to the location of the base symbol.

6. The method of claim 4, wherein the one or more alternate symbols are displayed in the menu according to one or more grouping criteria.

7. The method of claim 1, wherein the displaying comprises:
   displaying a first group of the alternate symbols; and
   responsive to a user request to view additional alternate symbols, displaying a second group of the alternate symbols.

8. The method of claim 1, wherein the displaying comprises:
   receiving a selected base symbol;
   determining a plurality of alternate symbols associated with the selected base symbol; and
   displaying the plurality of alternate symbols associated with the selected base symbol.

9. The mobile computing device of claim 2, wherein execution of the instructions to display the one or more alternate symbols on the display causes the computing device to:
   display a menu in a portion of the display, the menu including the one or more alternate symbols.

10. The mobile computing device of claim 9, wherein execution of the instructions to display the menu causes the computing device to further:
    determine a location of the base symbol; and
    display the menu, wherein at least a portion of the menu is adjacent to the location of the base symbol.

11. The mobile computing device of claim 9, wherein the one or more alternate symbols are displayed on the menu according to one or more grouping criteria.

12. The mobile computing device of claim 2, wherein execution of the instructions to display the one or more alternate symbols causes the computing device to:
    display a first group of the alternate symbols; and
    responsive to a user request to view additional alternate symbols, display a second group of the alternate symbols.

13. The mobile computing device of claim 2, wherein execution of the instructions to display the one or more alternate symbols causes the computing device to:
    receive, from the user input button, a selection identifying a selected base symbol;
    determine a plurality of alternate symbols associated with the selected base symbol; and
    display the plurality of alternate symbols associated with the selected base symbol.

14. The mobile computing device of claim 2, wherein the mobile computing device comprises a mobile telephone.

15. The computer-useable medium of claim 3, wherein displaying the one or more alternate symbols comprises:
    displaying a menu in a portion of a display device, the menu including the one or more alternate symbols.

16. The computer-useable medium of claim 15, wherein displaying the menu comprises:
    determining a location of the base symbol; and
    displaying the menu, wherein at least a portion of the menu is adjacent to the location of the base symbol.

17. The computer-useable medium of claim 15, wherein the one or more alternate symbols are displayed in the menu according to one or more grouping criteria.

18. The computer-useable medium of claim 3, wherein displaying the one or more alternate symbols comprises:
   displaying a first group of the alternate symbols; and
   responsive to a user request to view additional alternate symbols, displaying a second group of the alternate symbols.

19. The computer-useable medium of claim 3, wherein displaying the one or more alternate symbols comprises:
   receiving a selected base symbol;
   determining a plurality of alternate symbols associated with the selected base symbol; and
   displaying the plurality of alternate symbols associated with the selected base symbol.

20. The method of claim 1, wherein receiving keyed input requesting the one or more alternate symbols comprises:
   maintaining contact with the display for a designated amount of time.

21. The method of claim 1, wherein receiving keyed input requesting the one or more alternate symbols comprises:
   holding down a key representing the base symbol for a designated amount of time.

22. The mobile computing device of claim 2, wherein the user input mechanism comprises the display, and the request to display the one more or more alternate symbols comprises:
   maintaining contact with the display for a designated amount of time.

23. The mobile computing device of claim 2, wherein the user input mechanism comprises a keypad, and the request to display the one more or more alternate symbols comprises:
   holding down a key representing the base symbol for a designated amount of time.

24. The computer-useable medium of claim 3, wherein the user input mechanism comprises the display, and the request to display the one more or more alternate symbols comprises:
   maintaining contact with the display for a designated amount of time.

25. The computer-useable medium of claim 3, wherein the user input mechanism comprises a keypad, and the request to display the one more or more alternate symbols comprises:
   holding down a key representing the base symbol for a designated amount of time.

* * * * *